DIRECTIONAL CONTROL AND REVERSE VALVE

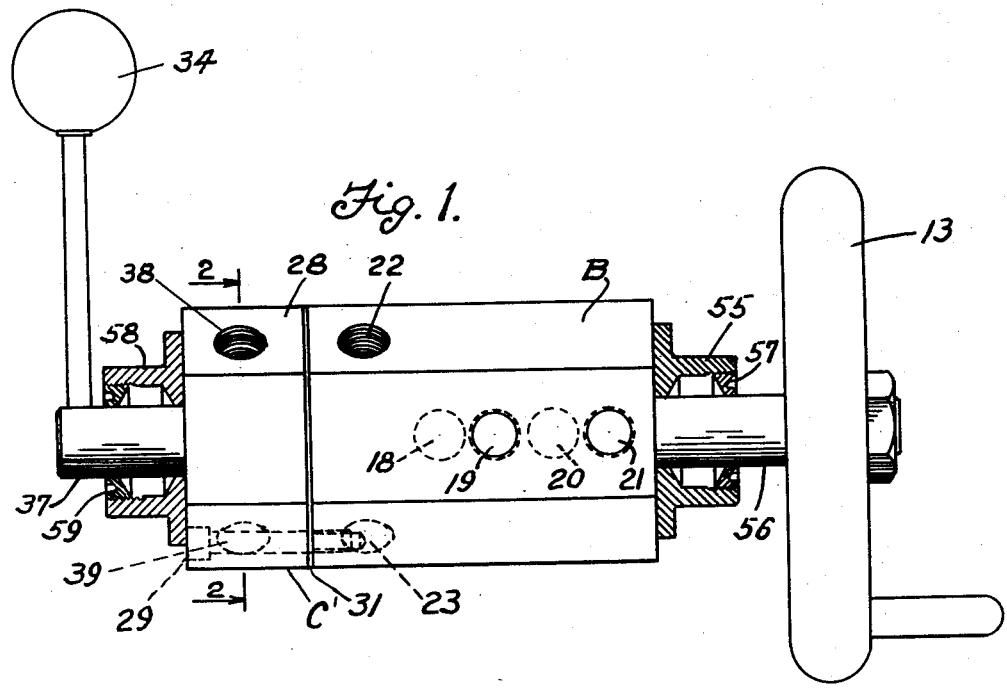
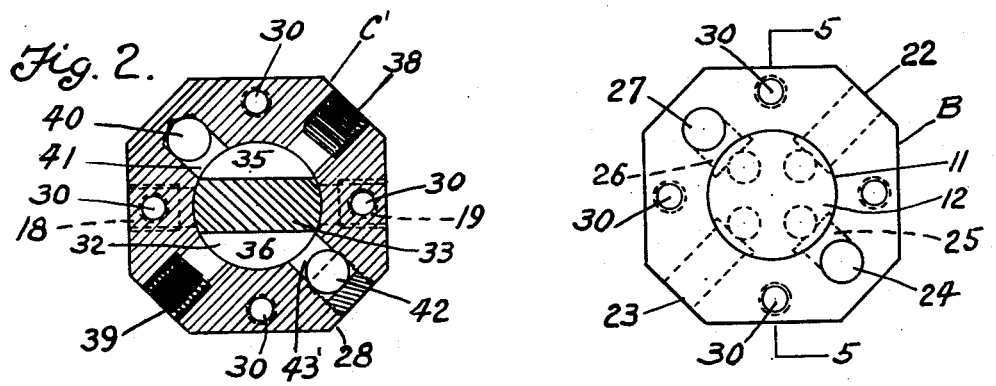
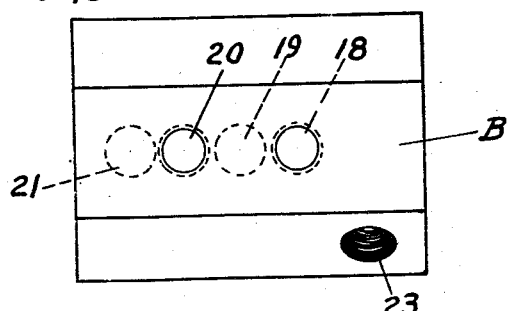

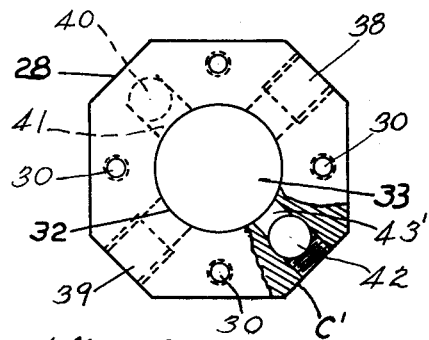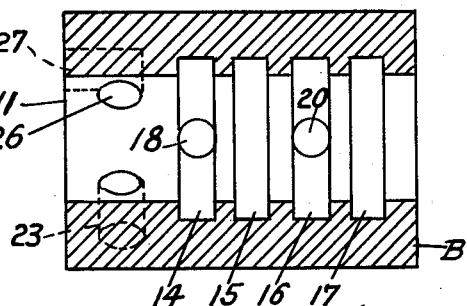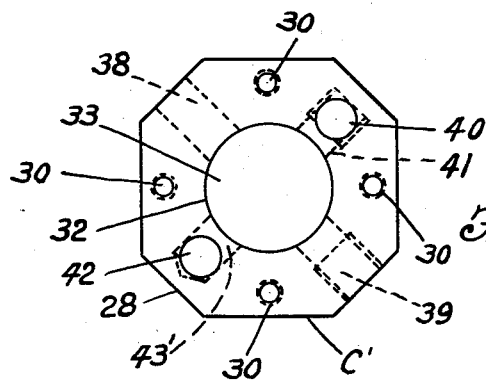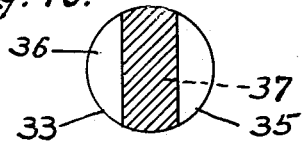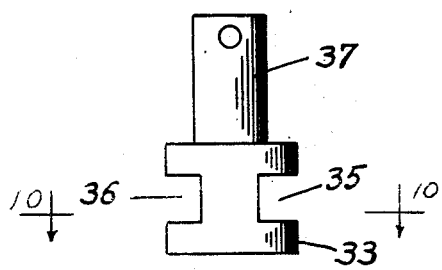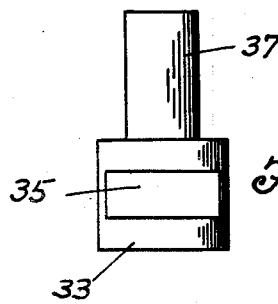
Inventor
MANUEL TURCHAN
CURTIS WALKER
By Robert A. Sloman
Attorney May 1, 1945. M. TURCHAN ET AL 2,374,714

Filed July 1, 1942 3 Sheets-Sheet 3

Inventor
MANUEL TURCHAN
CURTIS WALKER
By Robert A. Sloman
Attorney

Patented May 1, 1945

2,374,714

UNITED STATES PATENT OFFICE 2,374,714

DIRECTIONAL CONTROL AND REVERSE VALVE

Manuel Turchan, Dearborn, and Curtis Walker, Detroit, Mich.

Application July 1, 1942, Serial No. 449,354

15 Claims. (Cl. 277—50)

This invention relates to a directional control valve for use in combination with three dimensional hydraulic duplicating mechanisms employing a tracer mechanism for operative engagement with a pattern, and also employing a suitable milling tool for operative engagement with a work-piece, whereby the pattern is accurately reproduced in said work. By three dimensional control of the work table it is seen that profiling and contouring may be accomplished at the same time, in a complete circumambulatory path.

A tracer mechanism is employed as set out in our co-pending application Serial No. 366,082, filed November 18, 1940 of which the present application is a continuation in part; and also in our co-pending divisional application, Serial No. 443,156, filed May 15, 1942, now Patent No. 2,331,-817, granted October 12, 1942.

The tracer mechanism, not herein set out in detail, is adapted to control relative reciprocable feeding of the work table with respect to the cutting tool; and this operation as set out in the above co-pending applications is entirely independent of the directional control and reverse valve hereinafter described.

However the above mentioned tracer mechanism is also adapted to control relative reciprocable longitudinal and cross-feeding of the work piece with respect to the cutter as fully set out in our co-pending applications above referred to.

In carrying out the above operations it is seen that a relative circumambulatory traverse of the work-piece can be made by the cutter, or with the work table moving relatively to the cutter. At certain points of this traverse the longitudinal feed in either direction may be combined with a varying direction changing cross-feed, depending upon the particular shape of the pattern sought to be reproduced.

Therefore cross-feeding throughout the traverse of the longitudinal axis of the work is controlled by the tracer mechanism in a manner fully set out in the co-pending applications referred to above.

It will be understood that with a constant longitudinal feed, the direction of the cross feed will be reversed at some point or points. This operation may be accomplished by the tracer the details of which are not set out herein.

However as the cutter in its circumambulatory path begins to travel around the short axis of the work piece it appears desirable that for the extent of this traverse that the longitudinal feed be governed by the tracer, so that changes in direction of the longitudinal feed may be accurately controlled. At the same time it is desirable to provide a constant cross feeding. Constant feeding in either case is governed by providing a constant fluid pressure source to either end of the fluid control cylinders for regulating either the longitudinal feed or the cross feed of the work table relative to a rotating cutter. It is understood that reciprocable cylinders are employed secured to the work table for causing reciprocable longitudinal and reciprocable cross feeding thereof.

As the cutter travels further in its path around the work it will be seen that as the tracer again goes through the longitudinal axis of the pattern in the opposite direction that tracer control should again be in the cross feed cylinder. And again as it becomes time to traverse across the short axis of the work it is desirable to again place tracer control in the longitudinal feed cylinder.

In this manner the cutter is enabled to travel completely around the work relatively, thereby carrying out a complete contouring and profiling operation to accurately reproduce the pattern in the work piece.

The present invention relates to a directional control and reverse valve whereby tracer control may be changed at will from the cross feed controlling cylinder to the longitudinal feed controlling cylinder alternately as the cutter progresses in its circumambulatory path around the work.

It is the object of the present invention to provide a manually operable directional control valve for changing tracer control from the cross feed cylinder to the longitudinal feed cylinder.

It is the object herein to provide a directional control valve adapted to progressively and alternately change the direction of movement of the longitudinal and cross feed cylinders as the cutter travels relatively around the work.

It is the further object herein to provide a directional control valve which, with constant feeding in one direction and tracer controlled cross feeding in another direction, will be able to alternately change tracer control from one feed to the other, and constant feed from one cylinder to the other. Whereby with constant feeding in the longitudinal feed cylinder, at the moment that constant feeding is again directed to the longitudinal feed cylinder after having intermediately been in the cross feed cylinder, that the constant feeding will then be in the reverse direction, and similarly by giving alternate reversal of direction of constant feed to the cross feed cylinder.

It is a further object of this invention to provide a reversing means in combination with the directional control valve whereby the constant feeding in one direction may be immediately reversed without further adjustment of the directional control valve itself.

These and other object will appear in the following specification, claims and drawings of which:

Fig. 1 is a side elevational view of the directional control and reverse valve.

Fig. 2 is a sectional view on line 2—2 of Fig. 1.

Fig. 3 is a left end view of the control valve housing with the reversing mechanism removed.

Fig. 4 is a rear side elevational view of the same.

Fig. 5 is a section on line 5—5 of Fig. 3.

Fig. 6 is a left end elevational view of the reverse valve housing.

Fig. 7 is a right end elevational view of the same.

Fig. 8 is a front elevational view of the rotatable reversing valve member.

Fig. 9 is a side elevational view of the same.

Fig. 10 is a section on line 10—10 of Fig. 8.

Figure 11:
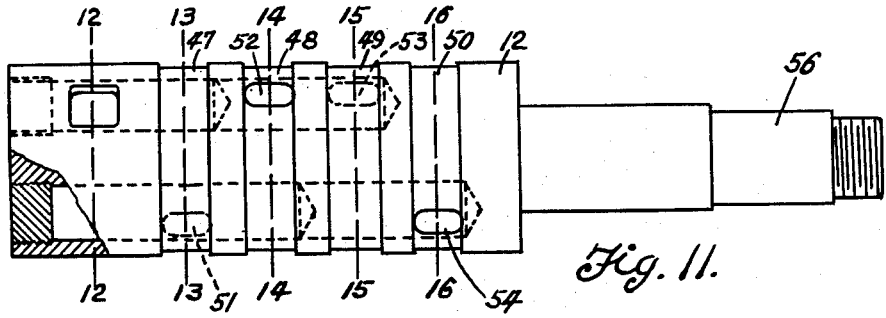
Fig. 11 is a plan view of the plunger for the directional control valve.
Figure 12:
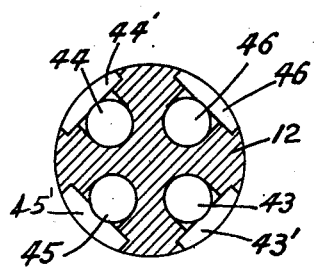
Figure 13:
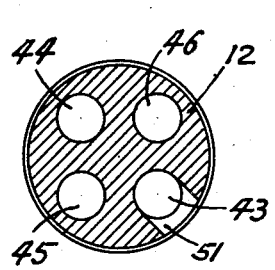
Figure 14:
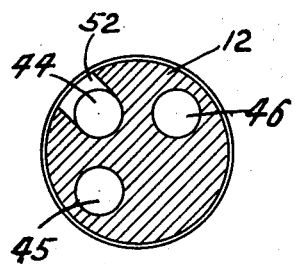
Figure 15:
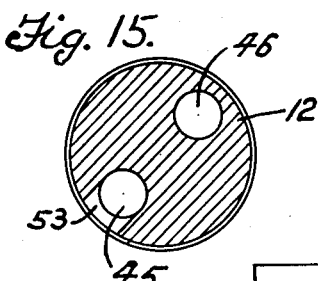
Figure 16:
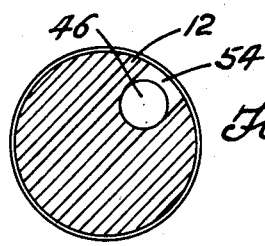

Fig. 12 is a section on line 12—12 of Fig. 11.
Fig. 13 is a section on line 13—13 of Fig. 11.
Fig. 14 is a section on line 14—14 of Fig. 11.
Fig. 15 is a section on line 15—15 of Fig. 11.
Fig. 16 is a section on line 16—16 of Fig. 11.

Figure 17:
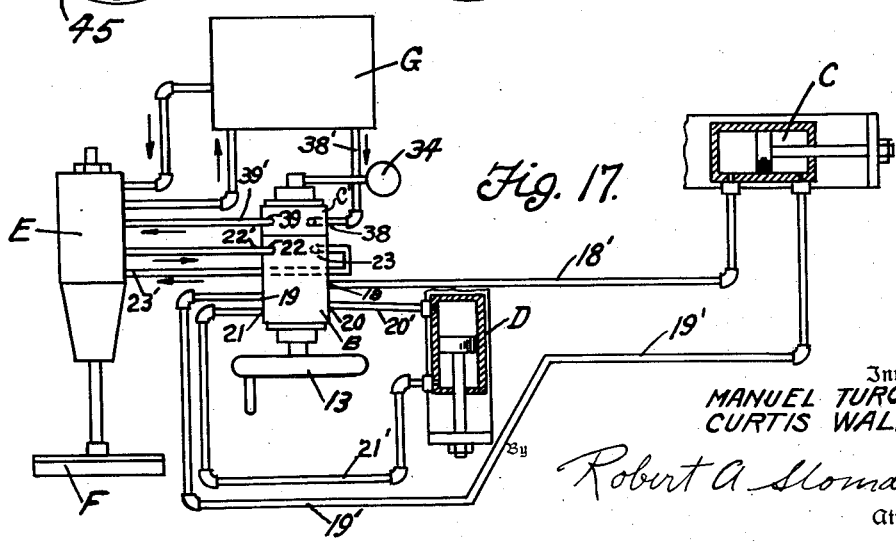

Fig. 17 is a diagrammatic view of the valve, tracer, hydraulic unit and control cylinders.

It will be understood that the above drawings are merely illustrations of a preferable embodiment of our invention and that other embodiments are possible within the scope of the claims hereinafter set out.

Referring to the drawings in Figs. 1, 3, 4 and 5, the directional control valve is comprised of a housing B with a cylindrical opening 11 therethrough within which is rotatably journaled the valve plunger 12 manually operated by the hand wheel 13.

Annular openings 14, 15, 16 and 17 are provisioned therein in respective communication with the cylinder ports 18, 19, 20 and 21. Ports 18 and 19 are adapted for connection by suitable conduits 18' and 19' to opposite ends of a reciprocable work table feeding cylinder, as for instance the longitudinal feed cylinder C. Ports 20 and 21 are adapted for connection through suitable conduits 20' or 21' to opposite ends of another reciprocable work table feeding cylinder, as for instance the cross feed cylinder D.

Variable fluid port 22 adjacent the end of housing B is adapted for fluid connection through conduit 22' to the control valve within a suitable tracer mechanism E which operatively engages the pattern sought to be reproduced, whereby fluid under pressure from the tracer is directed to the directional control valve for direction to either of the two work table controlling cylinders C and D, and to either end thereof depending upon the relative rotated position of the plunger 12 hereafter described in detail.

Another variable fluid port 23 is oppositely disposed from port 22 within valve housing B, also adapted for connection with the above mentioned tracer control valve through conduit 23'. Consequently fluid from the tracer directed to port 22 goes to one end of the longitudinal feed cylinder C through conduit 18' going out of housing B through port 18, while the fluid on the other side of the piston within said cylinder is forced back through conduit 19' to the control valve through port 19 and thence to port 23. From port 23 in housing B said exhaust fluid is conducted back to the tracer control valve through conduit 23' whence it is suitably exhausted to a hydraulic unit G.

If on the other hand the control valve in the tracer E is displaced by the operating mechanism within the tracer housing as it engages the pattern F, fluid from the tracer may get to the directional control valve through conduit 23' and port 23, and thence to the opposite end of the longitudinal feed cylinder C through conduit 19'; and the exhaust from said feed cylinder on the other side of the piston will then return by conduits 18' and 22' to the tracer E through the port 22 in the directional control valve B.

Referring again to Fig. 3 constant fluid port 24 is seen in the end of valve housing B for receiving fluid under constant pressure which is conducted through a passage 25 to the valve plunger 12 whence it is conducted by said plunger to one end or the other of, for instance, the cross feed cylinder D through the port 20 in valve housing B and conduit 20'. On the other hand exhaust from said cylinder on the other side of the piston therein returns to the directional control valve B through conduit 21' to port 21 for communication with the plunger 12 whence it is conducted back to the passage 26 and constant fluid port 27 in the end of valve housing B, for subsequent exhaustion in the manner later to be described.

On the other hand depending upon the position of the reverse valve hereinafter described, fluid under constant pressure may enter the directional control valve B through port 27 and exhaust through port 24.

The flow of constant pressure fluid is governed by reverse valve member C' shown in Figs. 1, 2, 7, 8 and 9. Its housing 28 corresponding in shape to the main valve housing B is suitably secured thereto by threaded bolts 29 disposed through openings 30 in the reverse valve housing 28 and main valve housing B, with a suitable separator or gasket 31 interposed therebetween.

A cylindrical opening 32 is provisioned through housing 28 for rotatably journaling a reverse valve control member 33 manually operable by handle 34. The reverse valve control member 33 cylindrical in shape and shown in Figs. 8, 9 and 10, is slotted at 35 and 36, and has formed as a part thereof an actuating shaft 37 on the end of which is secured a manually operable handle 34.

In Fig. 2 the reverse valve C' is shown with a constant fluid pressure inlet 38 adapted for connection through conduit 38' with a suitable fluid pressure source within the hydraulic unit G. A similar outlet opening for constant pressure exhausting is provisioned at 39 for exhausting fluid from the particular cylinder at the moment under constant feed control through conduit 39' back to the tracer E for subsequent exhausting in the manner hereinafter set out.

Both inlet 38 and outlet 39 communicate with the interior central opening 32. A reversing port 40 is shown in Figs. 2 and 7 joining passage 41 to the central opening 32. With the rotatable reverse valve member 33 in the position shown in Fig. 2, fluid under constant pressure from inlet 38 is conducted through slot 35 to the passage 41 and port 40.

Similarly a reversing port 42 is provided in housing 28 with a passage 43' joined thereto communicating with the central opening 32. In the position of the rotatable reverse valve member 33 as shown in Fig. 2, opening 42 is an exhaust port for the other side of the cylinder at the moment receiving constant pressure fluid. Port 42 and passage 43' thus conduct exhaust fluid through the central opening 32 through the slot 36 and to the reverse valve exhaust opening 39 whence it is suitably conducted away through conduit 39'.

It is seen from Fig. 2 that by clockwise movement of the reverse valve member 33 a quarter of a turn fluid under pressure will be delivered via inlet 38 and slot 35 and through passage 43' to the pressure port 42. And in a similar manner the exhaust from the other side of the cylinder under constant pressure feeding will return through port 40, passage 41, slot 36 and outlet opening 39 for disposal through conduit 39'.

Thus it is seen that by rotation one quarter of a turn of reverse valve member 33 that fluid under constant pressure is directed to either port 40 or 42, thus providing a means for quickly reversing the direction of movement of the feed cylinder which happens to be under constant fluid control. For instance in traveling around a work piece it may be desirable to back up a short distance from any point along the circumambulatory traverse.

With the reverse valve housing C' secured in place against the left end of the main valve housing B by bolts 29 it is seen that reversing ports 40 and 42 in housing C' coincide in communicating relation with constant fluid ports 27 and 24 respectively in main valve housing B. Thus fluid under constant pressure independent of the operation of the tracer E may be directed through either port 24 or 27 or changed at will from one to the other.

Valve housing B also has a tracer controlled fluid source coming in at variable fluid port 22 from conduit 22' and returning to the tracer control valve through variable fluid port 23 and conduit 23'; or fluid may come from the tracer through port 23 and return through port 22 depending upon the operation of tracer E. On the other hand four cylinder ports 18, 19, 20 and 21 are provisioned within the valve housing with suitable conduits 18', 19', 20' and 21' joined to each providing fluid communication to both ends of each work table controlling cylinder C and D respectively.

A manually rotatable plunger 12, shown in Fig. 11, is journaled within cylindrical opening 11 for directing the constant pressure fluid coming into the directional control valve housing B at either port 24 or 27, out through any of the cylinder ports 18, 19, 20 or 21, and the tracer controlled fluid pressure source coming into the valve housing at ports 22 or 23, out through any of the valve cylinder ports 20 or 21 and 18 and 19. Said control valve also providing at the same time exhaust connections for the other two ports back to one or the other of the constant pressure ports 24 and 27 and also to one or the other of the tracer controlled variable fluid ports 22 and 23.

Said plunger 12 has provisioned longitudinally therein non-communicating passages 43, 44, 45 and 46 all terminating at one end of the plunger in the four radially positioned passages 43', 44', 45' and 46', each of which is adapted for progressive communication with each of the ports 22, 23, 24 and 27 respectively as the plunger is manually rotated one-fourth of a turn at one time by hand wheel 13.

A plurality of annular recesses 47, 48, 49 and 50 are provisioned within plunger 12 to coincide with the corresponding annular recesses 14, 15, 16 and 17 on the inside of the valve housing B as shown in Fig. 5.

Longitudinal opening 43 terminates at port opening 51 within annular recess 47 to establish communication with the corresponding cylinder port 18 within the annular recess 14. Longitudinal openings 44, 45 and 46 all of varying lengths from opening 43 likewise respectively terminate at port openings 52, 53 and 54 within annular recesses 48, 49 and 50, to establish communication respectively with the corresponding cylinder ports 19, 20 and 21 within the annular recesses 15, 16 and 17 in the valve housing B.

Consequently in turning plunger 12 a quarter of a turn at a time it is possible to provide communication from any one of the ports 22, 23, 24 or 27 in the control valve to any desired cylinder port 18, 19, 20 or 21 in the valve housing for providing control to any particular end of either the longitudinal or cross feed cylinders; and at the same time also providing communication from the other ports to each of the other ends remaining in said cylinders.

For example fluid under constant pressure through conduit 38' from the hydraulic unit G can travel via 38, 35, 41, 40, 27, 26, 44, 52, 19 and thence to one end of for instance, the longitudinal feed cylinder C through conduit 19'. Exhaust from the other side thereof thus returns via conduit 18', 18, 51, 43, 25, 24, 42, 43', 36 and 39 and thence through conduit 39' back to tracer for subsequent exhausting.

At the same time tracer controlled fluid goes from conduit 22' into the directional control valve housing B at port 22 and via 46, 54, 21 and conduit 21' to one end of for instance, the cross feed cylinder D. The exhaust from the other side thereof goes back via conduit 20' to cylinder port 20, 53, 45, 23, and back to the tracer valve via conduit 23' for exhausting.

In operation by turning handle 34 of the reverse valve a quarter of a turn clockwise, constant pressure from conduit 38' to the longitudinal feed cylinder C is reversed or sent to the other end thereof through conduit 19' via 38, 35, 43', 42, 24, 25, 43, 51, 18 and conduit 18'. And at the same time exhaust returns from the opposite end of said cylinder via conduit 19', 19, 52, 44, 26, 27, 40, 41, 36 and 39 and thence through conduit 39' back to tracer E.

By turning the reverse valve handle back one-quarter of a turn counter-clockwise constant feed is again reversed in the longitudinal feed cylinder C as first set out. Throughout this operation there has been no change in the tracer controlled fluid supply to the cross feed cylinder D through conduit 21' at one end thereof and exhaust therefrom at the other end through conduit 20'.

In progressively traversing around a work piece in a circumambulatory path if it is desired to change the constant feed from the longitudinal feed cylinder C to the cross-feed cylinder D, with tracer control changed from the cross feed cylinder to the longitudinal feed cylinder C, all that is necessary is to rotate the plunger 12 a quarter of a turn clockwise.

Constant feed from the reverse valve at 38 goes via 35, 41, 40, 27, 26, 46, 54 and 21 and through conduit 21' to one end of the cross feed cylinder D. While exhaust therefrom on the other side of said cylinder goes back to the directional control valve via conduit 20', 20, 53, 45, 25, 24, 42, 43', 36 and 39.

At the same time tracer control goes to longitudinal feed cylinder C via conduit 22', 22, 43, 51, 18 and conduit 18'; and the exhaust from the other side of said cylinder returns via conduit 19', 19, 52, 44, 23 and conduit 23' back to the tracer E for exhausting.

Again constant feed, now in the cross feed cylinder D, may be reversed merely by rotating handle 34 of the reverse valve C' one-quarter of a turn clockwise in the manner hereinabove set out.

Thus it is seen that a versatile directional control and reverse valve is provided for governing longitudinal and cross feeding of the work piece supporting table with respect to a rotatable cutter.

Constant feeding may be changed from longitudinal feed in one direction to cross feeding in one direction. By further operation of the hand wheel 13 constant feed may be again directed to the longitudinal feed cylinder in the opposite direction; and by another quarter turn of the hand wheel constant feed could go to the cross feed cylinder in the opposite direction.

The reverse valve above described is also adapted to reverse constant feeding in any one cylinder at any time without further operation of the control valve hand wheel 13, which normally would require several adjustments for accomplishing the same result.

A packing gland 55 is shown in Fig. 1 suitably bolted on the end of the valve housing B, with the operating shaft 56 forming a part of the plunger 12 journaled therethrough. An adjusting nut 57 is disposed within the end of the packing gland for adjusting the same. Similarly a packing gland 58 is provisioned upon the outer end of the reverse valve housing C' suitably secured thereto. The actuating shaft 37 for the reverse valve member 33 is rotatably journaled through the packing gland 58 and an adjusting nut 59 is provided as shown.

With the reverse valve handle turned at any time a quarter of a turn to reverse the direction of feed of the cylinder under constant feeding, continuous traverse in a circumambulatory path around the work may be continued in that reverse direction merely by operating the hand wheel 13 in quarter turns progressively in the opposite direction.

Having described our invention, reference should now be had to the claims which follow for determining the scope thereof.

We claim:

1. A directional control and reverse valve comprised of a housing having a plurality of cylinder ports adapted for connection to opposite ends of work table longitudinal and cross feed cylinders, constant fluid ports for receiving and exhausting a constant fluid source, tracer ports for receiving and exhausting a tracer controlled fluid source, a manually rotatable member journaled within said housing having a plurality of non-communicating passages therein adapted to separately register at their one ends with each of said cylinder ports, the other ends of said passages having openings for separately registering with each of said other ports, and means for directing said constant fluid to either of said constant fluid ports.

2. A directional control and reverse valve comprised of a housing having a plurality of cylinder ports, constant fluid ports receiving and exhausting a constant fluid source, means for alternately directing said constant fluid to either constant fluid port, said housing also having variable fluid ports for receiving and exhausting a variable volume fluid, rotatable means journaled within said housing having a plurality of passages therein for separately registering at their one ends with each of said cylinder ports, the other ends of said passages having openings for separately and alternately registering with each of said other ports.

3. A directional control and reverse valve comprised of a housing having a plurality of cylinder ports, and a plurality of communicating annular recesses within said housing corresponding to each port, constant fluid ports for receiving and exhausting a constant fluid source, means for alternately directing said constant fluid to either constant fluid port, said housing having variable fluid ports for receiving and exhausting a variable volume fluid, rotatable means journaled within said housing having a plurality of passages therein for separately registering at their one ends with each of said annular recesses, the other ends of said passages having openings for separately and alternately registering with each of said constant and variable fluid ports.

4. A directional control and reverse valve comprised of a housing having a plurality of cylinder ports, and a plurality of communicating annular recesses within said housing corresponding to each port, constant fluid ports for receiving and exhausting a constant fluid source, means for alternately directing said constant fluid to either constant fluid port, said housing having variable fluid ports for receiving and exhausting a variable fluid source, rotatable means journaled within said housing having a plurality of annular openings therein in registry with said housing annular recesses, and also having a plurality of passages therein for separately registering at their one ends with each of said annular openings, the other ends of said passages having openings for separately and alternately registering with each of said constant and variable fluid ports.

5. A directional control and reverse valve comprised of a housing having a plurality of cylinder ports, and a plurality of communicating annular recesses within said housing corresponding to each port, constant fluid ports for receiving and exhausting a constant fluid source, a manually rotatable member within said housing adapted to alternately direct said constant fluid to either constant fluid port, said housing having variable fluid ports for receiving and exhausting a variable fluid source, rotatable means journaled within said housing having a plurality of passages therein for separately registering at their one ends with each of said annular recesses, the other ends of said passages having openings for separately and alternately registering with each of said constant and variable fluid ports.

6. A directional control and reverse valve comprised of a housing having a plurality of cylinder ports, and a plurality of communicating annular recesses within said housing corresponding to each port, variable fluid ports for receiving and exhausting a variable fluid source, said housing also having constant fluid ports for receiving and exhausting a constant fluid source, reversing means on said housing having reversing ports adapted for communication with said constant fluid ports, said means having an inlet and an outlet for receiving and exhausting a constant fluid source, manually rotatable means within said means adapted to direct said fluid to either of said reversing ports, and rotatable means journaled within said housing having a plurality of passages therein for separately registering their one ends with each of said annular recesses, the other ends of said passages having openings for separately and alternately registering with each of said variable and constant fluid ports.

7. A directional control and reverse valve comprised of a housing having a plurality of cylinder ports, and a plurality of communicating annular recesses within said housing corresponding to each port, constant fluid ports for receiving and exhausting a constant fluid source, a cylindrical oppositely slotted member rotatably journaled within said housing adapted for alternately directing constant fluid through either constant fluid port, and at the same time conducting exhaust fluid from the other constant fluid port, said housing having variable fluid ports for receiving and exhausting a variable volume fluid, rotatable means journaled within said housing having a plurality of passages therein for separately registering at their one ends with each of said annular recesses, the other ends of said passages having openings for separately and alternately registering with each of said constant and variable fluid ports.

8. A directional control and reverse valve comprised of a housing having a plurality of oppositely disposed side cylinder ports, and a plurality of annular recesses within said housing corresponding to each port, said housing having constant fluid ports in one end for receiving and exhausting a constant fluid source, a secondary housing adapted for removable attachment to said housing, and having reversing ports on one end for delivering and exhausting a constant fluid source, adapted to coincide in communicating relation with said constant fluid ports, said secondary housing having constant fluid inlet and exhaust openings, rotatable means within said secondary housing adapted to direct constant fluid through said inlet opening to either of said reversing ports, and at the same time direct exhaust from said other reversing port to said exhaust opening, said housing having variable fluid ports for receiving and exhausting a variable fluid source, rotatable means journaled within said housing having a plurality of passages therein for separately registering at their one ends with each of said annular recesses, the other ends of said passages having openings for separately and alternately registering with each of said constant and variable fluid ports.

9. A directional control valve comprised of a housing having a plurality of cylinder ports adapted for connection to opposite ends of work table longitudinal and cross feed cylinders, constant fluid ports for receiving and exhausting a constant fluid source, tracer ports for receiving and exhausting a tracer controlled fluid source, a manually rotatable member journaled within said housing having a plurality of non-communicating passages therein adapted to separately register at their one ends with each of said cylinder ports, the other ends of said passages having openings for separately registering with each of said other ports, each of said latter openings being adapted, on movement of said rotatable member, to register progressively with each of said constant fluid and tracer ports, and means for directing said constant fluid to either of said constant fluid ports.

10. A directional control valve comprised of a housing having a plurality of cylinder ports adapted for connection to opposite ends of work table longitudinal and cross feed cylinders, constant fluid ports for receiving and exhausting a constant fluid source, tracer ports for receiving and exhausting a tracer controlled fluid source, a manually rotatable member journaled within said housing having a plurality of non-communicating passages therein adapted to separately register at their one ends with each of said cylinder ports, the other ends of said passages having openings for separately registering with each of said other ports, each of said latter openings being adapted, on quarter turns of said rotatable member, to register progressively with each of said constant fluid and tracer ports, and means for directing said constant fluid to either of said constant fluid ports.

11. A directional control valve comprised of a housing having a plurality of cylinder ports adapted for connection to opposite ends of work table longitudinal and cross feed cylinders, constant fluid ports for receiving and exhausting a constant fluid source, tracer ports for receiving and exhausting a tracer controlled fluid source, a manually rotatable member journaled within said housing having a plurality of non-communicating passages therein adapted to separately register at their one ends with each of said cylinder ports, the other ends of said passages having openings for separately registering with each of said other ports, each of said latter openings being adapted, on quarter turns of said rotatable member, to register progressively with each of said constant fluid and tracer ports, whereby fluid communication from one of said constant fluid ports is directed progressively from the longitudinal feed cylinder to the cross feed cylinder at one of their ends, and then to the longitudinal feed cylinder, and then to the cross feed cylinder at the other of their ends, at the same time as fluid communication from one of said tracer ports is directed from the cross feed cylinder to the longitudinal feed cylinder at one of their ends, and then to the cross feed cylinder, and then to the longitudinal feed cylinder at the other of their ends, and means for directing said constant fluid to either of said constant fluid ports.

12. A directional control and reverse valve comprised of a housing having a plurality of cylinder ports, variable fluid ports for receiving and exhausting a variable fluid source, said housing also having constant fluid ports for receiving and exhausting a constant fluid source, reversing means on said housing having reversing ports adapted for communication with said constant fluid ports, said means having an inlet and an outlet for receiving and exhausting a constant fluid source, manually rotatable means within said means adapted to direct said fluid to either of said reversing ports, and rotatable means journaled within said housing having a plurality of passages therein for separately registering at their one ends with each of said cylinder ports, the other ends of said passages having openings for separately and alternately registering with each of said variable and constant fluid ports.

13. A directional control and reverse valve comprised of a housing having a plurality of cylinder ports, constant fluid ports for receiving and exhausting a constant fluid source, a cylindrical oppositely slotted member rotatably journaled within said housing adapted for alternately directing constant fluid through either constant fluid port, and at the same time conducting exhaust fluid from the other constant fluid port, said housing having variable fluid ports for receiving and exhausting a variable volume fluid, rotatable means journaled within said housing having a plurality of passages therein for separately registering at their one ends with each of said cylinder ports, the other ends of said passages having openings for separately and alternately registering with each of said constant and variable fluid ports.

14. A directional control valve comprised of a housing having a plurality of longitudinally spaced cylinder ports adapted for connection to opposite ends of work table longitudinal and cross feed cylinders, constant fluid ports for receiving and exhausting a constant fluid source, tracer ports for receiving and exhausting a tracer controlled fluid source, said constant fluid and tracer ports being spaced from said cylinder ports and radially arranged around said housing, a manually rotatable member journaled within said housing having a plurality of non-communicating passages therein of varying lengths adapted to separately register at their one ends with each of said cylinder ports, the other ends of said passages having openings for separately registering with each of said other ports, and means for directing said constant fluid to either of said constant fluid ports.

15. A directional control valve comprised of a housing having a plurality of longitudinally spaced cylinder ports adapted for connection to opposite ends of work table longitudinal and cross feed cylinders, constant fluid ports for receiving and exhausting a constant fluid source, tracer ports for receiving and exhausting a tracer controlled fluid source, a manually rotatable member journaled within said housing having a plurality of non-communicating passages therein of varying lengths adapted to separately register at their one ends with each of said cylinder ports, the other ends of said passages having openings for separately registering with each of said other ports, said rotatable member being adapted for intermittent quarter turns for providing continuous communication through all the passages therein between each cylinder port and each constant fluid and tracer ports, and means for directing said constant fluid to either of said constant fluid ports.

MANUEL TURCHAN.
CURTIS WALKER.